United States Patent

Bacs, Jr.

[11] Patent Number: 5,933,664
[45] Date of Patent: Aug. 3, 1999

[54] METHOD OF USING A PARALLAX SCANNING LENS APERTURE IN A RANGE-FINDING APPLICATION

[75] Inventor: Aron Bacs, Jr., Burlke, Va.

[73] Assignee: Vision III Imaging, Inc., Herndon, Va.

[21] Appl. No.: 08/948,654

[22] Filed: Oct. 10, 1997

Related U.S. Application Data

[62] Division of application No. 08/456,408, Jun. 1, 1995, Pat. No. 5,699,112, which is a division of application No. 08/148,916, Nov. 5, 1993, Pat. No. 5,448,332.

[51] Int. Cl.⁶ ............................................. G03B 35/00
[52] U.S. Cl. .......................... 396/324; 352/43; 348/135; 359/478; 901/47
[58] Field of Search ............................ 396/324, 333; 352/43, 86; 353/10; 359/22, 23, 25, 26, 462, 463, 478, 479; 348/44, 135; 356/12; 901/47

[56] References Cited

U.S. PATENT DOCUMENTS

| | | |
|---|---|---|
| 1,351,508 | 8/1920 | Duhem et al. . |
| 1,950,473 | 3/1934 | Brand ......................................... 88/16.6 |
| 2,002,090 | 5/1935 | Ives ........................................... 88/16.6 |
| 2,101,979 | 12/1937 | Brock ......................................... 88/16.6 |
| 2,157,099 | 5/1939 | Rosenhauer ................................ 88/16.6 |
| 2,158,660 | 5/1939 | Kanolt ........................................... 95/36 |
| 2,356,441 | 8/1944 | Bickley ...................................... 88/16.6 |
| 2,931,268 | 4/1960 | Gelb . |
| 2,933,008 | 4/1960 | Barnett ......................................... 88/14 |
| 3,503,316 | 3/1970 | Takano et al. . |
| 3,608,457 | 9/1971 | Barker ........................................... 95/18 |
| 3,800,307 | 3/1974 | Wechsler . |
| 3,815,979 | 6/1974 | Collender . |
| 3,950,097 | 4/1976 | Göpfert et al. . |
| 4,006,291 | 2/1977 | Imsand ...................................... 358/92 |
| 4,062,045 | 12/1977 | Iwane ........................................ 358/88 |
| 4,124,291 | 11/1978 | Lo et al. . |
| 4,231,642 | 11/1980 | Collender . |
| 4,290,083 | 9/1981 | Collender . |
| 4,303,316 | 12/1981 | McElveen ................................. 352/57 |
| 4,367,486 | 1/1983 | Eichenlaub . |
| 4,420,230 | 12/1983 | McElveen ................................. 352/43 |
| 4,429,328 | 1/1984 | Jones, Jr. et al. .......................... 358/88 |
| 4,436,369 | 3/1984 | Bukowski . |
| 4,476,492 | 10/1984 | Muth ........................................ 358/208 |
| 4,528,587 | 7/1985 | Jones, Jr. ................................... 358/92 |
| 4,714,319 | 12/1987 | Zeevi et al. ............................. 350/144 |
| 4,740,073 | 4/1988 | Meacham . |
| 4,757,350 | 7/1988 | Street . |
| 4,815,819 | 3/1989 | Mayhew et al. ......................... 350/144 |
| 4,893,183 | 1/1990 | Nayar . |
| 4,943,860 | 7/1990 | Hattori . |
| 4,966,436 | 10/1990 | Mayhew et al. ......................... 350/143 |
| 5,014,126 | 5/1991 | Pritchard et al. ......................... 358/91 |
| 5,081,530 | 1/1992 | Medina .................................... 358/88 |
| 5,083,199 | 1/1992 | Börner . |
| 5,153,633 | 10/1992 | Otani . |
| 5,157,484 | 10/1992 | Prichard et al. .......................... 358/91 |
| 5,253,071 | 10/1993 | Mackay . |
| 5,283,640 | 2/1994 | Tilton . |
| 5,337,096 | 8/1994 | Qu et al. . |
| 5,337,102 | 8/1994 | Winnek . |
| 5,416,558 | 5/1995 | Katayama et al. . |

FOREIGN PATENT DOCUMENTS

| | | |
|---|---|---|
| 0 335 292 | 10/1989 | European Pat. Off. . |
| 57-37993 | 3/1982 | Japan . |
| 1-107247 | 4/1989 | Japan . |
| 06035022 | 2/1994 | Japan . |
| 2 135 470 | 8/1984 | United Kingdom . |

*Primary Examiner*—Howard B. Blankenship
*Attorney, Agent, or Firm*—Finnegan, Henderson, Farabow, Garrett & Dunner, L.L.P.

[57] ABSTRACT

A lens aperture of an autostereoscopic camera is moved in a parallax scanning pattern through a plurality of disparity positions offset from the optical axis of the camera lens. Images of a scene being photographed, as viewed through the lens aperture in its various disparity positions, are recorded for subsequent display in three dimensional illusion when viewed with the unaided eye. The size of the lens aperture and the parallax scanning pattern are adjustable to suit conditions. The lens aperture may be defined as a through-hole in an opaque card or a planar array of cells switched between transparent and opaque states. In addition to stereoscopic imaging, the moving lens aperture principle of the present invention may be utilized in range-finding and camera image stabilization applications.

2 Claims, 7 Drawing Sheets

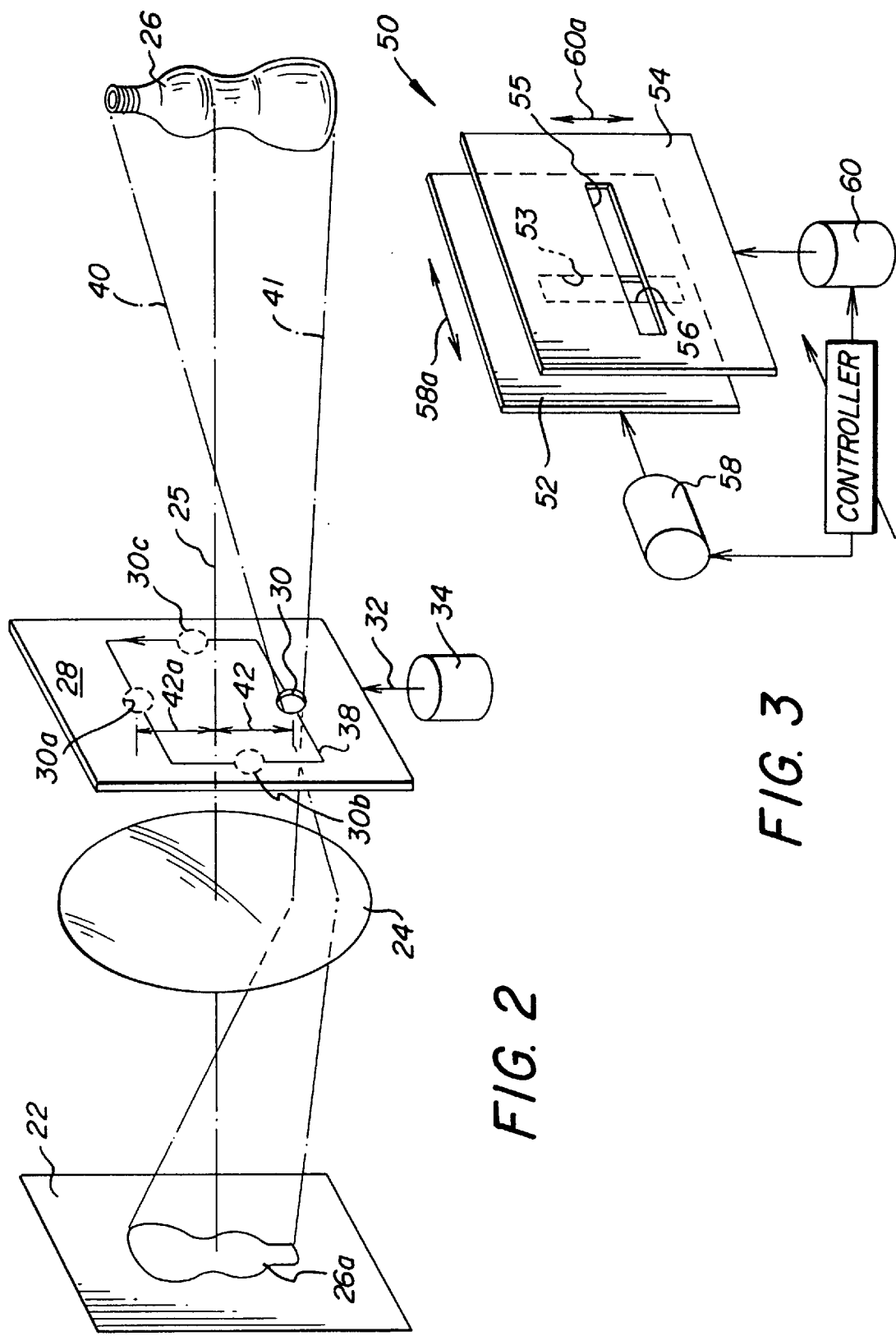

FIG. 4
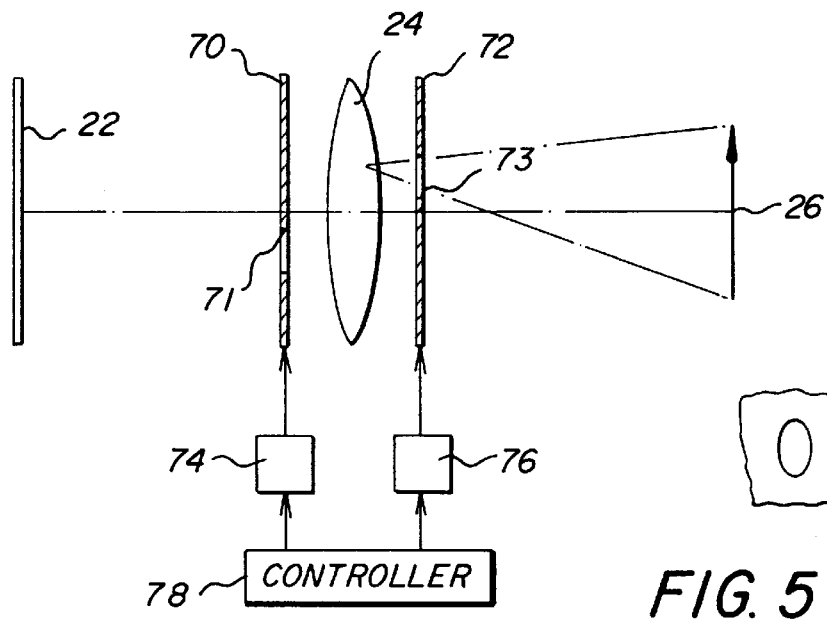
FIG. 5(a)
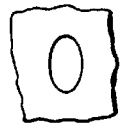
FIG. 5(b)
FIG. 7
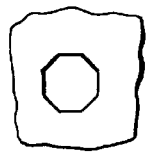
FIG. 5(c)
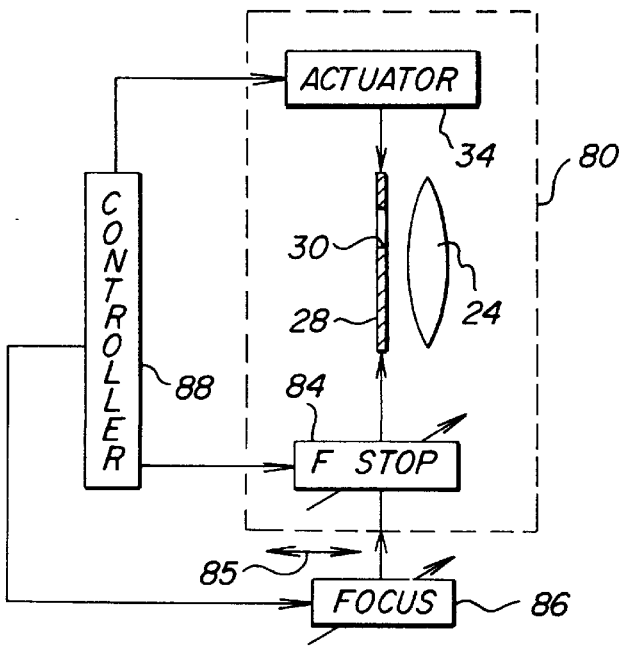
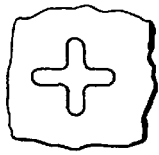
FIG. 5(d)
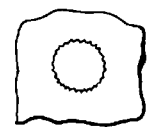

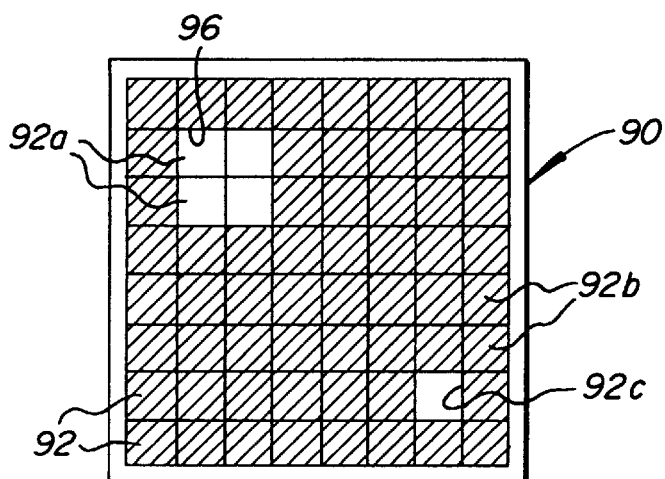
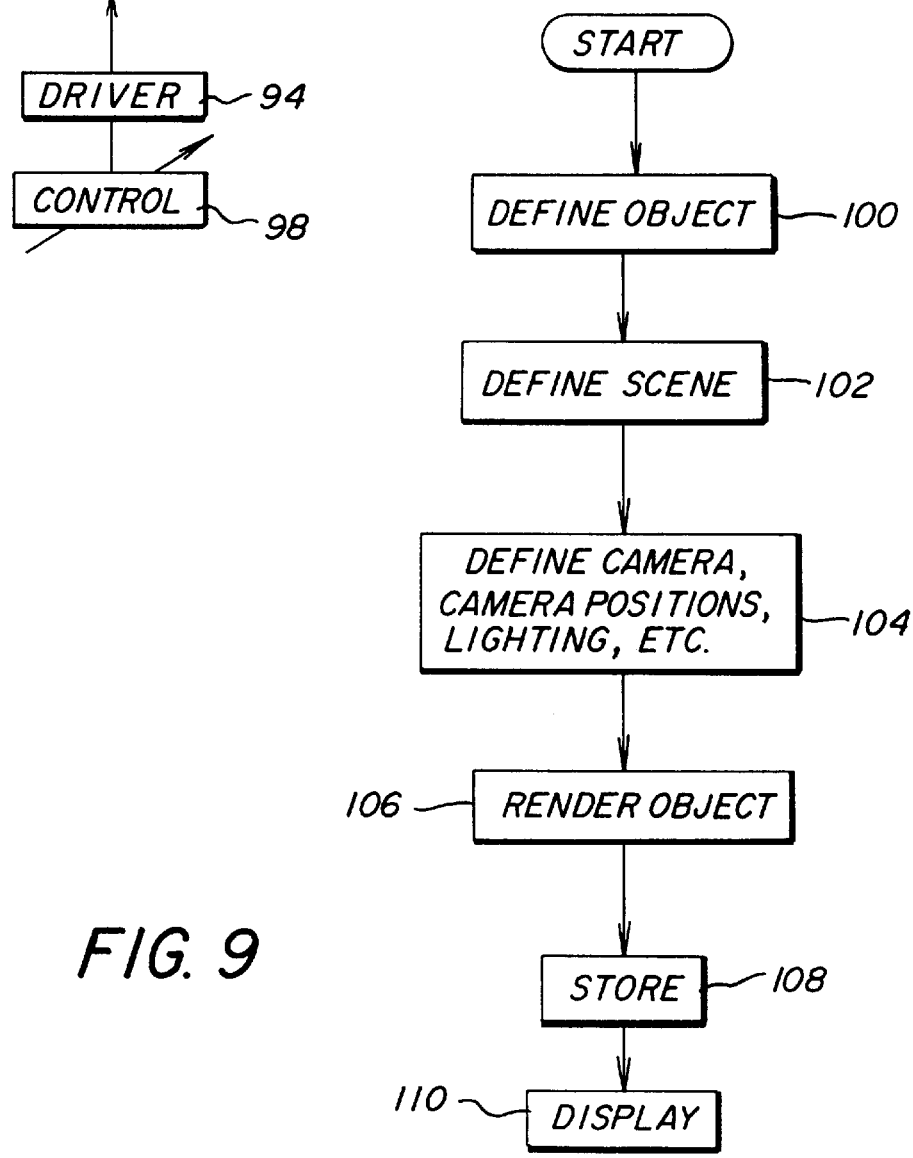
FIG. 8
FIG. 9

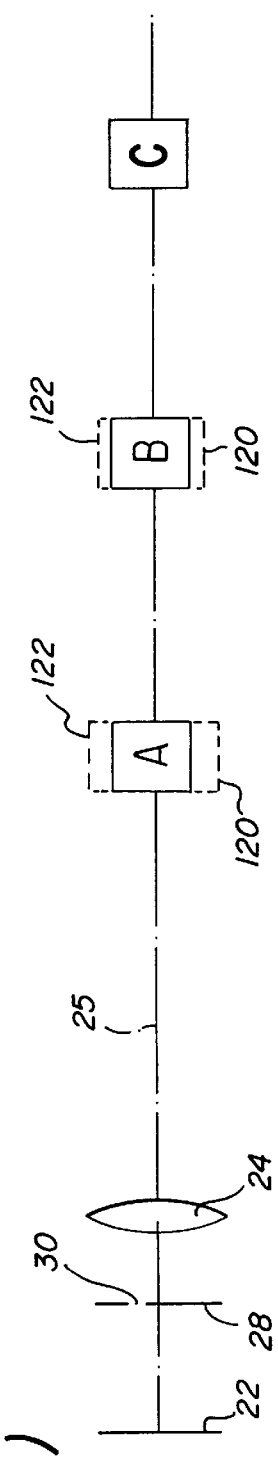
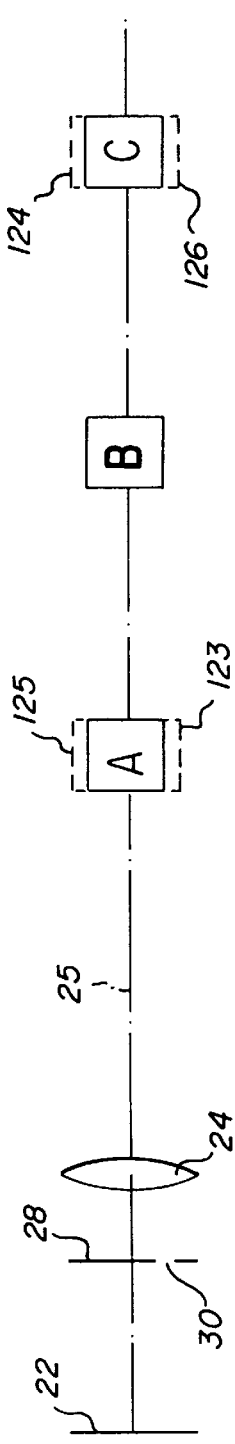
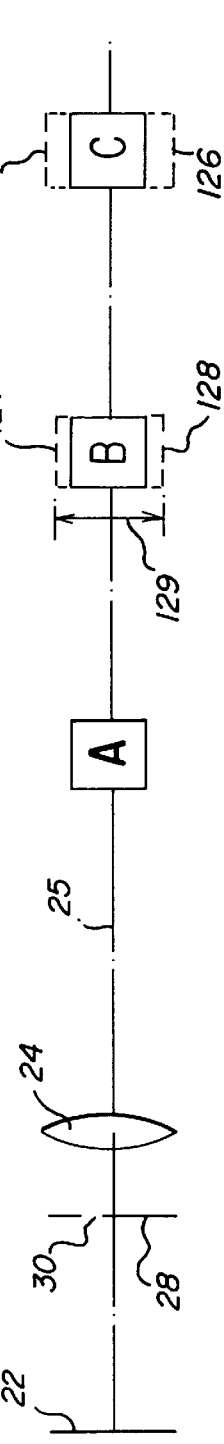

METHOD OF USING A PARALLAX SCANNING LENS APERTURE IN A RANGE-FINDING APPLICATION

REFERENCE TO RELATED APPLICATIONS

This is a division of application Ser. No. 08/456,408, filed Jun. 1, 1995, now U. S. Pat. No. 5,699,112, which, in turn, is a division of Ser. No. 08/148,916, filed Nov. 5, 1993, now U.S. Pat. No. 5,448,332.

BACKGROUND OF THE INVENTION

I. Field of the Invention

The present invention relates to a stereoscopic apparatus and method for producing images that can be displayed as three-dimensional illusions and more particularly to an autostereoscopic imaging apparatus and method for producing images that, on display, can be perceived to be three-dimensional without the use of special viewing aids.

II. Prior Art

The production of two-dimensional images that can be displayed to provide a three-dimensional illusion has been a long standing goal in the visual arts field. Methods and apparatuses for producing such three-dimensional illusions have to some extent paralleled the increased understanding of the physiology of human depth perception.

Binocular (stereo) vision requires two eyes to view a scene with overlapping visual fields. Each eye views a scene from a slightly different parallax angle and focuses the scene unto a retina. The two-dimensional retinal images are transmitted by optic nerves to the brain's visual cortex, where they are combined, in a process known as stereopsis, to form a three-dimensional model of the scene.

Depth perception of three-dimensional space depends on various kinds of information (cues) perceived from the scene being viewed, such as relative size, linear perspective, interposition, light and shadow, gradients (monocular cues), as well as retinal image size, retinal disparity, accommodation, convergence (binocular cues), and familiarity with the subject matter of the viewed scene (learned cues).

Retinal disparity, which is the separation between a person's eyes, provides parallax information. It is now well known that depth perception can be achieved when left and right eye depth information is presented alternately to the brain, as long as the time interval does not exceed 100 milliseconds. It has been demonstrated that the brain can extract parallax information from a three-dimensional scene even when the eyes are alternately covered and uncovered for periods up to 100 milliseconds each. The brain can also accept and process parallax information presented to both eyes if sequenced properly. The ideal view cycle sequencing rate has been determined to be between 3–6 Hz.

True three-dimensional image displays can be divided into two main categories, stereoscopic or binocular and autostereoscopic. Stereoscopic techniques (including stereoscopes, polarization, anaglyphic, Pulfrich, and shuttering technologies) require the viewer to use a viewing device, such as polarized glasses. Autostereoscopic techniques, such as holography, lenticular screens, parallax barriers, alternating-pairs and parallax scans produce images in a true three-dimensional illusion without the use of special viewing glasses.

Prior art autostereoscopic television and motion picture systems have utilized the approach of alternately displaying views of a scene recorded by two cameras from different points of view. U.S. Pat. No. 4,006,291 to Imsand; U.S. Pat. Nos. 4,303,316 to McElveen; U.S. Pat. No. 4,429,328 to Jones et al.; U.S. Pat. No. 4,966,436 to Mayhew & Prichard, all utilized two cameras to record horizontally, vertically, or a combination of horizontally and vertically displaced views of a scene. While this autostereoscopic approach produces images which provide three-dimensional illusion when displayed, precision matching of the two cameras is required. Improper alignment of the cameras, lens mismatches in focal length and/or focus, chrominance and illuminance mismatches, and misplaced convergent points all contribute to image instability. Also, considerable operator skill is required to continuously adjust disparity, convergence and time-displacement rates of image recordings in a coordinated manner to maintain a stable image.

Image stability can be rendered less noticeable by the use of masking techniques. Camera motion is very effective in hiding rocking motions of images, apparently because the brain places less importance on rocking motion than on camera motion. This could result from some sort of natural stabilizing phenomena or mechanism of the brain that allows us to see clearly while walking or running, when images would otherwise bounce.

To avoid the drawbacks associated with a two-camera autostereoscopic system, autostereoscopic methods and apparatuses using a single camera/single lens have been developed. Mayhew et al. U.S. Pat. Nos. 5,014,126 and 5,157,484 disclose single camera autostereoscopic systems capable of recording images which, when displayed, are perceived by a viewer in three-dimension. Commonly assigned, copending U.S. patent application No. 08/115,101, filed Sep. 2, 1993 by Fernekes et al. discloses a method and apparatus, wherein a single camera records images while undergoing oscillatory parallax scanning motion.

While the single camera autostereoscopic imaging systems disclosed in the above cited prior art are effective in producing high quality, stable images that can be perceived in three-dimension when viewed with the unaided eye, unfortunately the apparatuses are rather bulky and heavy, relatively complex in construction, and consume a meaningful amount of power in operation.

SUMMARY OF THE INVENTION

A principle objective of the present invention is to provide improved method and apparatus for producing images in two-dimension that, upon display, can be perceived as three-dimensional with the unaided eye. The method and apparatus of the invention utilize an autostereoscopic approach to three-dimensional imaging, thus avoiding the drawbacks inherent in the stereoscopic approach. The autostereoscopic method and apparatus of the present invention utilizes a single imaging device, such as a motion picture or video camera, and thus the disadvantages of a two-camera autostereoscopic approach are avoided. Moreover, the apparatus of the present invention is compact in size and light weight, efficient in construction and operation, and convenient to implement in conventional motion picture and video cameras.

To achieve these objectives and advantages, the improved single-camera autostereoscopic imaging method of the present invention comprises the steps of providing an imaging lens having an optical axis directed toward a scene, providing a lens aperture, moving the aperture relative to the lens in a parallax scanning pattern through diverse disparity points displaced from the optical axis of the lens, generating a succession of time-spaced images of the scene as viewed through the aperture from a plurality of the disparity points, and recording the images. This method can be practiced using an imaging device, such as a motion picture camera or a video camera, or a computer suitably programmed to simulate the lens, the aperture and the lens aperture motion.

The apparatus of the present invention, in its most basic form, includes an imaging plane, a lens for focusing images of objects in a field of view on the imaging plane, an optical element positioned adjacent the lens and providing an aperture, and an actuator for oscillating the optical element such as to produce a parallax scanning motion of the aperture relative to the optical axis of the lens. A succession of time-spaced recordings are made of the object images focused on the imaging plane, as viewed through the aperture from a plurality of different parallax views or disparity points offset from the lens optical axis.

By virtue of the method and apparatus of the present invention, display of the two-dimensional image recordings in corresponding time-spaced succession can be perceived as a three-dimensional illusion.

The single camera autostereoscopic imaging method and apparatus of the present invention are readily conducive to numerous modifications. The aperture may be located in front of or behind the lens or between lenses of a multiple lens set. The aperture may take a variety of sizes and shapes, be adjustable in size and/or have different edge characteristics. Furthermore, more than one aperture may be utilized. The pattern of the parallax scanning motion of the aperture may be of a variety of configurations ranging from circular to rectangular to complex lissajous configurations. The optical element may take the form of one or more opaque cards having one or more through-holes or slits serving to create a lens aperture. Also, the optical element can be implemented as a liquid crystal panel or a ferro-electric panel (spatial light modulator) providing a matrix array of cells that can be selectively switched between opaque and transparent states.

Moreover, depth information derived from the images of objects viewed through the lens aperture during parallax scanning motion can be utilized in range finding applications. In addition, controlled lens aperture movement can be utilized to compensate for spurious camera motion and thus stabilize image recordings.

It is to be understood that both the foregoing general description and the following detailed description are exemplary and are intended to provide further explanation of the invention as claimed.

The accompanying drawings are included to provide a further understanding of the invention and are incorporated in and constitute part of this specification, illustrate embodiments of the invention and together with the description serve to explain the principles of the invention.

BRIEF DESCRIPTION OF THE DRAWINGS

FIG. 2 is a perspective view, partially in schematic form, illustrating an alternative embodiment of the invention.

FIG. 3 is a perspective view of an alternative form of optical element that can be utilized in the embodiments of FIGS. 1 and 2.

FIG. 4 is a side view, partially in schematic form, of another embodiment of the invention.

FIGS. 5(a)–5(d) illustrate various aperture configurations that may be utilized in the embodiments of FIGS. 1 and 2.

FIG. 7 is a schematic diagram illustrating various controls that would typically be applied to the autostereoscopic imaging embodiments of FIGS. 1 and 2 in practicing the present invention.

FIG. 8 is a front view of an alternative optical element usable in the embodiments of FIGS. 1, 2 and 4.

FIG. 9 is a flow chart illustrating an application of the present invention to computer generated imaging.

FIGS. 10(a)–10(c) are schematic diagrams illustrating the operation of the autostereoscopic imaging apparatus of the present invention.

Like reference numerals refer to corresponding parts throughout the several view of the drawings.

DETAILED DESCRIPTION

Figure 1:
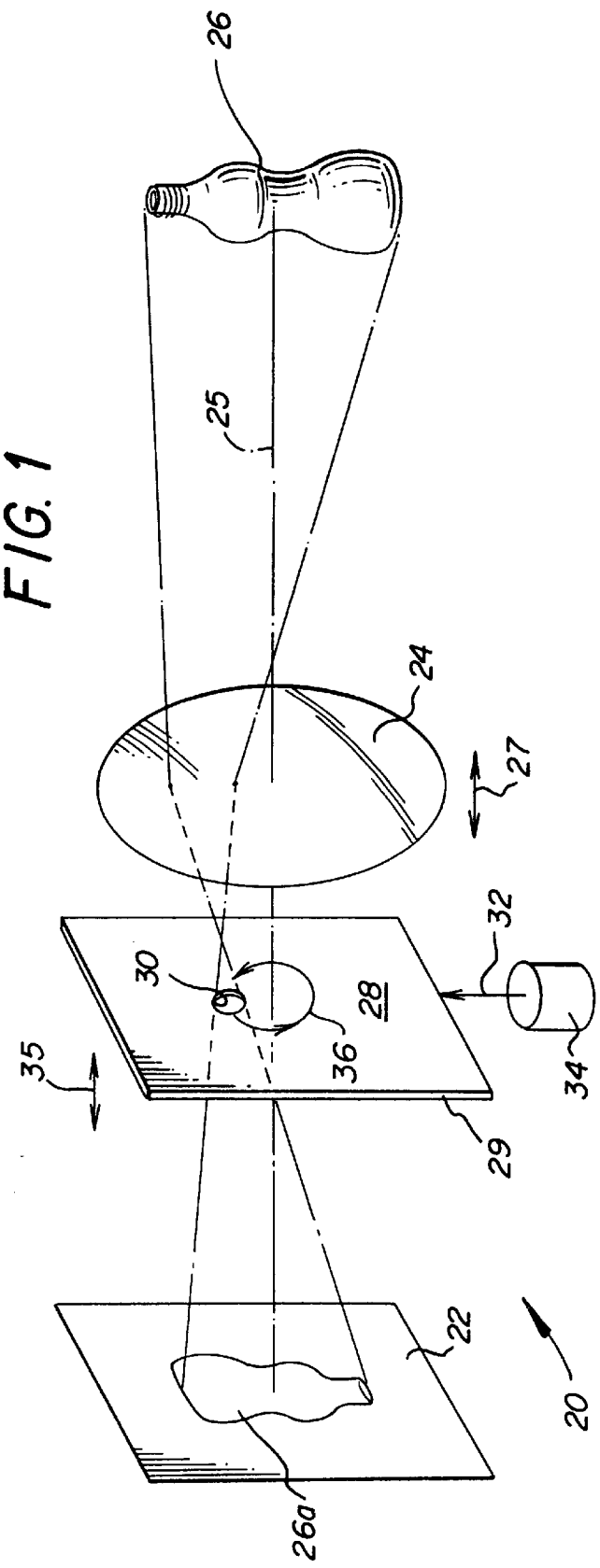
FIG. 1 is a perspective view, partially in schematic form, illustrating one embodiment of the present invention.
Figure 6C:
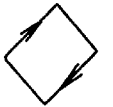
FIGS. 6(a)–6(f) illustrate alternative parallax scanning patterns that may be executed by the optical elements in FIGS. 1–4.
Figure 6E:
Figure 6D:
Figure 6F:
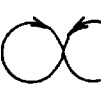
Figure 6A:
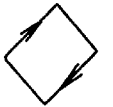
Figure 6B:

The autostereoscopic imaging apparatus of the present invention disclosed in FIGS. 1–8 is directed to a stereoscopic imaging application wherein a succession of time-spaced images of a scene are recorded by a single imaging device in a manner such that a subsequent display of the images can be perceived as three-dimensional. Thus, as seen in FIG. 1, an autostereoscopic imaging apparatus, generally indicated at 20, includes an imaging plane 22 of a suitable imaging device such as a film camera or video camera. Reference 24 indicates a camera lens which in practice typically comprises a set or system of multiple lenses. Lens 24 has an optical axis 25 which is directed at a distant object 26 in a scene to be imaged. In a conventional manner, the position of lens 24 is adjusted forwardly or rearwardly, as indicated by arrow 27, along its optical axis to focus an image 26a of object 26 on imaging plane 22 which represents the film plane of a film camera or a CCD array of a video camera.

In accordance with a signal feature of this embodiment of the present invention, an optical element 28, consisting of an opaque card 29 in which is formed a through-hole or aperture 30, is positioned between object 26 and imaging plane 22. FIG. 1 illustrates an optical element position immediately behind lens 24, i.e., between the lens and imaging plane 22, while FIG. 2 illustrates optical element 28 immediately in front of lens 24. Preferably, the optical element is located as close as possible to the lens iris (not shown) which can be positioned between lenses of a multiple lens set typically used in a camera. Ideally, optical element 28 would assume the position of and replace the lens iris.

The optical element is mechanically linked, as schematically indicated at 32, to an actuator or motor 34 which operates to move aperture 30 in a parallax scanning motion relative to lens optical axis 25. A circular parallax scanning pattern for aperture 30 is illustrated by arrow 36 in FIG. 1, while a rectangular scanning pattern is illustrated by arrow 38 in FIG. 2. Other parallax scanning patterns are illustrated in FIGS. 6(a)–6(f). Normally the aperture scanning patterns are centered about lens optical axis 25, however, under certain conditions, desirable visual effects can be achieved when the scanning pattern is off-centered relative to this optical axis. While scanning patterns will typically be limited to horizontal (X) and vertical (Y) coordinate motions in the plane of optical element 28 and transverse to optical axis 25, it will be understood that Z coordinate motion parallel to the optical axis, as illustrated by arrow 35 in FIG. 1, may be introduced in conjunction with X and Y coordinate motions for special effects and to mask motion artifacts.

With reference to FIG. 2, it is seen that light rays 40 from the top of object 26 pass through aperture 30 and are redirected by lens 24 toward a lower location on imaging plane 22 where a focused image of the object top is formed. Similarly, light rays 41 from the bottom of object 26 pass through aperture 30 and are redirected by the lens toward an upper location on the imaging plane where a focused image of the object bottom is formed. Light rays from objects portions between its top and bottom likewise pass through aperture 30 and lens 24 to complete the formation of focused image 26a. If an image 26a is recorded while aperture 30 is in the position shown in FIG. 2, it is seen that the point of view of this image has a vertical disparity represented by arrow 42 which is equal to the distance below optical axis 25. If the object image is recorded while the aperture is in phantom line position 30a indicated in FIG. 2, the point of view has a disparity equal to the vertical offset above the optical access as represented by arrow 42a. Similarly, image recordings taken while aperture 30 is in phantom line positions 30(b) and 30(c) have horizontal disparities equal to the aperture horizontal offsets from the optical axis 25.

Disparity, whether horizontal or vertical or components of both, is largely responsible for adding parallax to visual images. Portions of object volumes having essentially flat surfaces produce images which appear flat and two-dimensional. Changes in the viewing perspective do not change the appearance of these portions. However, portions of a object volume naturally having depth when viewed directly, do change their appearance or, more specifically, their position and aspect, as the viewing perspective is changed. Changes in the viewing perspective create corresponding edges on the image which do not perfectly match when the images are superimposed. Alternatively displaying these images creates contrast at these edges which is perceptible to the brain as depth.

FIG. 3 illustrates an alternative embodiment of an optical element, generally indicated at 50, for use in the apparatus of FIGS. 1 and 2. This optical element includes a pair of opaque cards 52 and 54 arranged in juxtaposed, parallel relation. Card 52 is provided with a vertically elongated, rectangular slit 53, while card 54 is provided with a horizontally elongated, rectangular slit 55. At the intersection of slits 53 and 55, a rectangular lens aperture 56 is created. An actuator 58 reciprocates card 52 in the horizontal direction, as indicated by arrow 58a, and an actuator 60 reciprocates card 54 in the vertical direction, as indicated by arrow 60a. It is seen that, by virtue of the relative motions of the cards, scanning motion of aperture 56 is produced. By adjusting amplitude, frequency, and phase of the card reciprocating motions, the lissajous parallax scanning patterns illustrated in FIGS. 1, 2 and 6(a)–6(f), as well as many other patterns, are readily achieved. While the lens aperture configuration is circular in FIGS. 1 and 2 and rectangular in FIG. 3, it may take other shapes, such as, for example, elliptical as illustrated in FIG. 5(a), octagonal as illustrated in FIG. 5(b), and cruciform as illustrated in FIG. 59(c). FIG. 5(d) illustrates that the lens aperture may have a soft or frayed edge, rather than a hard or sharp edge.

Regardless of the lens aperture configuration, it is important that it be bordered throughout by the opaque material of the optical element 28. Also, the parallax scanning pattern of the lens aperture should remain within the effective aperture of lens 24, which typically corresponds to 80% of the lens diameter. Thus, the size of lens aperture 30 should be significantly less than the size of this effective aperture of the lens, so that the lens aperture can assume disparity positions of sufficiently different reviewing perspectives (disparity) needed to provide depth perception. It will thus be appreciated that, as the size of lens aperture 30 increases, the depth of field, disparity, and exposure time will all decrease. Conversely, smaller lens aperture sizes provide larger depths of field, accommodate greater disparities, and require longer exposure times.

While the embodiments of FIGS. 1–3 utilize a single parallax scanning aperture, plural apertures may be utilized. As seen in FIG. 4, a pair of optical elements 70 and 72 are respectfully formed with lens apertures 71 and 73. Optical element 70 is positioned behind lens 24, and optical element 72 is positioned in front of the lens. Optical element 70 is oscillated by an actuator 74, while optical element 72 is oscillated by an actuator 76. These actuators are controlled by a controller 78 to produce parallax scanning motions of apertures 71 and 73. The scanning patterns of the two lens apertures may be of the same or different configurations and may be in synchronism with or independent of each other. The use of two parallax scanning apertures may be used for special effects and/or to mask a motion artifacts of object 26 as imaged on imaging plane 24.

FIG. 7 illustrates lens 24, optical element 28 and actuator 34 carried by a lens mount, schematically illustrated in phantom line at 80. Also included on the lens mount is an F stop adjustor 84 for adjusting the size of lens aperture 30 in accordance with available light and desired depth of field. Lens mount is moved fore and aft (arrow 85) by focus adjustor 86. A controller 88 may be provided to control actuator 34 to a desired parallax scanning motion for lens aperture 30, control F stop adjustor 84 to a desired lens aperture size, and control focus adjustor 86 to bring into focus a desired subject in the field of view.

As illustrated in FIG. 8, an optical element can also be implemented as a liquid crystal or ferro-electric panel (spatial light modulator), generally indicated at 90. These panels include a matrix array of cells 92 which can be individually addressed and activated by a driver 94 to create one or more transparent cells 92a amongst a remainder of opaque cells 92b. The transparent cell or cells 92a thus constitute a lens aperture 96 which can be readily moved about in a variety of parallax scanning patterns, including those illustrated in FIGS. 6(a)–6(f), by driver 94.

It will be appreciated that driver 94 may be externally, manually or automatically controlled, as indicated at 98, to vary the size and shape of aperture 96, as well as the configuration of the parallax scanning patter of the aperture. Moreover, as indicated at 96c, driver 94 can readily introduce one or more parallax scanning or stationary lens apertures, in addition to aperture 96, to create special effects or to mask motion artifacts. Also, rather than abruptly switching the cells between transparent and opaque states, the transition may be effected somewhat gradually through progressively changing degrees of gray scale. In practice, driver 94 and controller 98 may be implemented by a suitably programmed digital computer.

The principles of the present invention may also be applied in the computer generation of images which then can be displayed in three-dimensional illusion. FIG. 9 illustrates the basis steps involved. In step 100, an object and object motion are defined in three-dimensional space, and a scene to include the object is also defined in three-dimensional space in step 102. The imaging device or camera, camera positions (points of view), illumination, range, etc., are defined in step 104. Camera definitions include simulations of an imaging plane, lens and lens aperture parameters, such as size and shape. In step 106 the image is rendered by simulating a desired parallax scanning pattern of the lens aperture using a suitable ray tracing algorithm, and the rendered images are stored in computer memory on a frame-by-frame basis (step 108). The stored images can then be retrieved from memory for display on a computer monitor, recorded on video tape for display on a TV screen and/or recorded on film for projection on a screen (step 110).

From the foregoing description, it will be noted that, since only the lens aperture undergoes parallax scanning motion while the lens 24 remains stationary, the point of view of the lens aperture is always convergent on the object to which the lens is focused.

Thus, unlike prior single-camera autostereoscopic imaging apparatuses, such as disclosed in, for example, the cited U.S. patent application Ser. No. 08/115,101, a separate convergence adjustment is avoided in the apparatus of the present invention. That is, focus adjustment inherently establishes the appropriate convergence setting, which is an important feature of the present invention.

FIGS. 10(*a*)–10(*c*) are schematic diagrams illustrating how this important feature of the invention can be used to an advantage. In FIGS. 10(*a*), 10(*b*) and 10(*c*), objects A, B, and C represent objects at close range, mid-range, and far range, respectively, relative to imaging plane 22. If lens 24 is focused on far range object C, as depicted in FIG. 10(*a*), the image of this object appearing on imaging plane 22 remains stationary during parallax scanning motion of aperture 30. However, when aperture 30 moves upwardly to positions of vertical disparity above optical axis 25, for example, the images of objects A and B appearing on imaging plane 22 move downwardly, as indicated by phantom lines 120, relative to the stationary image of object C. Conversely, when aperture 30 moves downwardly to positions of vertical disparity below the optical axis, the images of objects A and B appearing on the imaging plane move upwardly, as indicated by phantom lines 122, relative to the stationary image of object C.

When lens 24 is focused on object B, as illustrated in FIG. 10(*b*), the image of this object remains stationary as aperture 30 undergoes parallax scanning motion. As the aperture scans upwardly, through positions of vertical disparity above optical axis 25, the image of object A appearing on imaging plane 22 moves downwardly, as indicated in phantom line at 123, relative to the stationary image of object B, while the image of object C appearing on the imaging plane moves upwardly, as indicated in phantom line at 124, relative to the object B stationary image. When the aperture moves downwardly through positions of vertical disparity below optical axis 25, the reverse conditions obtained, i.e., the image of object A moves upwardly (phantom lines 125), and the image from object C moves downwardly (phantom lines 126) relative to the stationary image of object B.

If lens 24 is focused on close range object A, the images of objects B and C move upwardly, as indicated by phantom lines 127, relative to the stationary image of object A, when aperture 30 scans through vertical parallax positions above optical axis 25. Conversely, the images of objects B and C move downwardly, as indicated in phantom line at 128, relative to the stationary image of object A when the lens aperture moves through vertical disparity positions below the optical axis.

This phenomena of relative motions of images of objects in the lens field of view observed during parallax scanning motion of lens aperture 30 can be utilized to advantage in range finding applications. Considering FIG. 10(*c*), assume that aperture 30 is scanned between positions of maximum vertical disparity (maximum offset from optical axis 25) to maximize the image motion of object B relative to the stationary image of object A to which the lens 24 is focused. If the distance between object A and a camera reference point, such as imaging plane 22, is known, the distance between object A and object B can be determined from the magnitude of the motion of the object B image relative to the object A image or from the peak-to-peak amplitude, indicated at 129, of the object B image motion. Such determination can be accurately computer calculated by triangulation using recorded images of objects A and B taken, for example, from extreme disparity points above and below optical axis 25. Alternatively, the measured amplitude 129 of object B image motion produced by aperture parallax scanning motion between extreme vertical disparity points can be used to access a look-up table and thereby determine the separation between objects A and B. It will be appreciated that a rather close approximation of the range of objects A, B and C from imaging plane 22 can be obtained by adjusting the focus of lens 24 to any one of these objects until the image of this object becomes stationary as appearing on imaging plane 22. The object range can then be determined from the focus setting that completely quiets all motion of the object image as observed on a video screen displaying the object image.

Figure 11:
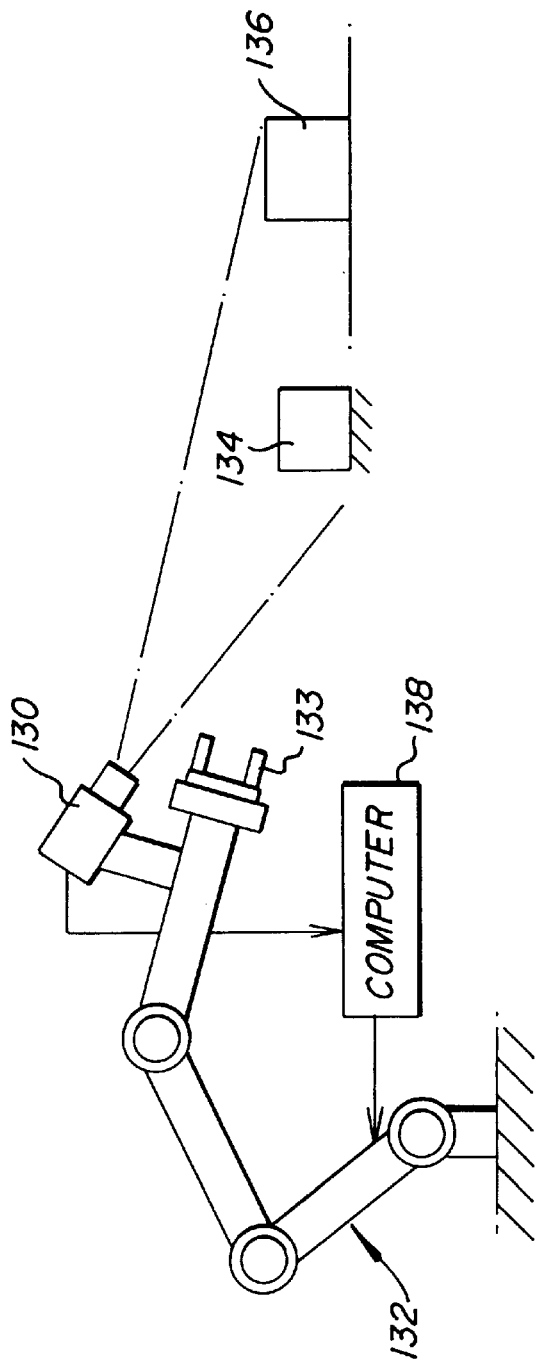
FIG. 11 is a schematic diagram illustrating the application of the present to range finding.

FIG. 11 illustrates an application of the present invention to a range-finding video camera 130 mounted by a robotic arm, generally indicated at 132. The video camera, located on the robotic arm in a reference position, is oriented to view a scene including a stationary reference object 134 and a target object 136 which is to be griped by a hand 133 of the robotic arm. The distance between video camera 130 in its reference position and reference object 134 is known. When the camera lens is focused on reference object 134, images of the reference and target objects are recorded as the lens aperture undergoes parallax scanning motion. The recorded images are analyzed by a computer 138 to determine the range of the target object relative to the camera based on the magnitude of target image motion relative to the stationary reference image and the known distance between the camera and the reference object. Knowing the target object range, the computer can readily control the motion of robotic arm 132 to bring hand 133 rapidly into the grasping relation with target object 136. It will be appreciated that video camera 130 may be stationed at any fixed reference position a known distance from reference object 134, rather than being mounted by the robotic arm.

By virtue of the present invention, parallax information sufficient to determine target range can be acquired using a single imaging device, e.g., video camera. This is a distinct advantage over the conventional practice of using two video cameras or sets of parallax mirrors and prisms.

Figure 12:
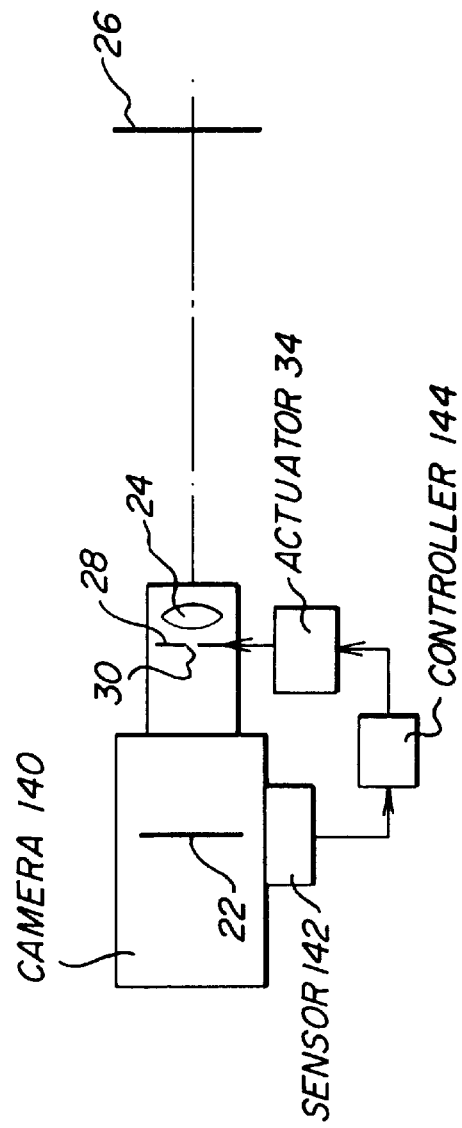
FIG. 12 is a schematic diagram illustrating the application of the present invention to camera image stabilization.

Another application of the present invention is illustrated in FIG. 12, which utilizes a moving lens aperture 30 to compensate for spurious motion of an imaging device 140, such as a film or video camera, and thus to stabilize the images of an object 26 focused on the imaging plane 22 of the camera. To implement this application of the invention, camera 140 is equipped with an inertial sensor 142, such as an accelerometer. This sensor sends signals indicative of camera motion to a controller 144 which translates the camera motion signals into drive signals for actuator 34 drivingly connected to optical element 28. If, during imaging of object 26, camera 140 experiences spurious upward motion, sensor 142, via controller 144, signals actuator 34 to move optical element 28 and thus lens aperture 30 downward. Downward camera motion induces upward motion of the lens aperture. It will be appreciated that by moving lens aperture in the opposite direction to spurious camera motion, the images of object 26 focused on the camera imagining plane by lens 24 can be stabilized against such camera motion. Image stabilization by compensating motion of the lens aperture in accordance with the present invention can be implemented quite inexpensively as compared with the current practices of gyro-stabilization of the entire camera or the use of moving mirrors and/or prisms to compensate for camera motion and thus steady the object images appearing on the camera imaging plane.

Figure 13:
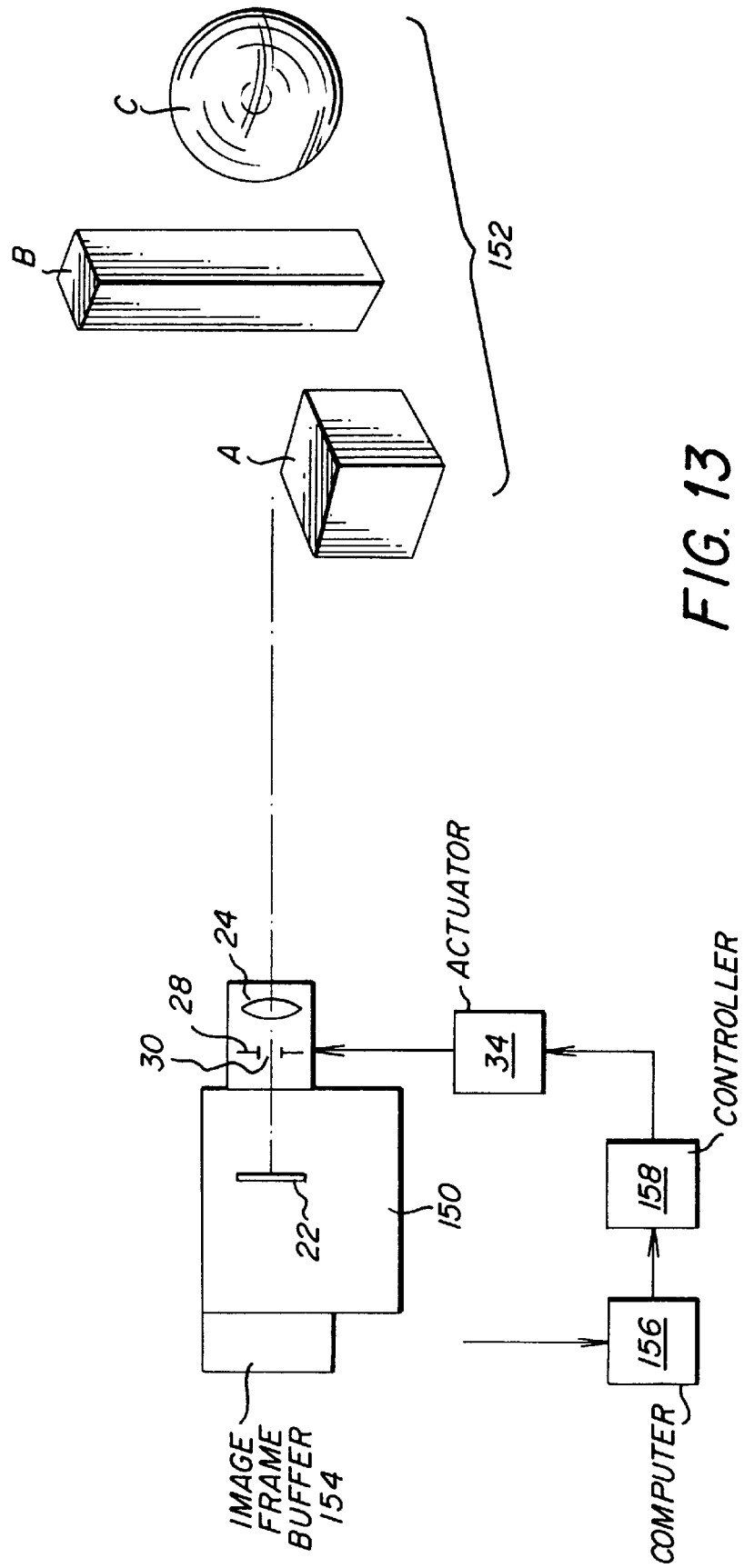
FIG. 13 is a schematic diagram illustrating the application of automatic disparity control to the autostereoscopic imaging apparatus of the present invention.

The motion of objects in a scene being imaged, such as objects A, B and C in FIGS. 10(a)–10(c), can also be used to automatically control lens aperture motion. Thus as illustrated in FIG. 13, a camera 150, such as a video or film camera, is aimed to view a scene 152 including objects A, B and C. The camera lens 24 is adjusted to focus the image of one of these objects on an imaging plane 22. Images of the scene are stored on a frame-by-frame basis in an image frame buffer 154. A computer 156 compares successive stored image frames, such as by subtracting one from the other, to quantify the motion characteristics of the images of the other objects relative to the stationary image of the focused object. The quantified motion characteristics are used by a controller 158 to adjustably control the parallax scanning motion, produced by actuator 34, of lens aperture 30 in optical element 28. In this manner, a desired three-dimensional effect can be automatically achieved by constantly monitoring the motions of object images appearing on imaging plane 22 and adjusting amplitude (offset of disparity positions from lens optical axis) and frequency of the lens aperture scanning motion according to the extents of relative image motions.

While the present invention has been described in the context of moving a lens aperture in a parallax scanning motion, as images of objects are recorded, at a rate of three to six Hz, it will be appreciated that effective depth perception of displayed images or object range can be achieved by providing an optical element which can alternatingly create a lens aperture at different disparity positions offset from the lens optical axis. Thus, rather than moving a single aperture in a parallax scanning motion through different disparity positions, an equivalent parallax scanning motion can be achieved by utilizing an optical element or combination of optical elements operated to create momentary lens apertures at various disparity positions vertically, horizontally and/or both horizontally and vertically offset from the lens optical axis. Using this approach, the optical element or elements can function as the camera shutter, as well as the lens aperture. The optical element of FIG. 8 is particular suited for this approach to the practice of the present invention.

It will be apparent to one skilled in the art that various modifications and variations can be made in the autostereoscopic imaging apparatus of the present invention without departing from the scope or spirit of the invention. Thus, it is intended that the present invention cover modifications and variations of this invention provided they come within the scope of the appended claims and their equivalents.

I claim:

1. A method of autostereoscopic imaging comprising the steps of:

providing an imaging plane;

providing a lens having an optical axis;

directing the optical axis toward an object;

creating a lens aperture at a succession of disparity positions offset from the optical axis;

observing an image of the object appearing on the imaging plane; and adjusting the lens to a focus setting that eliminates motion of the object image appearing on the imaging plane.

2. The method of claim 1, further including the step of determining object range from the focus setting.

* * * * *